No. 770,108. PATENTED SEPT. 13, 1904.
W. RAINFORTH.
APPARATUS FOR MAKING DEEPLY CORRUGATED FURNACE FLUES.
APPLICATION FILED SEPT. 19, 1903.
NO MODEL. 5 SHEETS—SHEET 1.

Witnesses.
Inventor.
William Rainforth
by Henry L. Reynolds,
his attorney.

No. 770,108. PATENTED SEPT. 13, 1904.
W. RAINFORTH.
APPARATUS FOR MAKING DEEPLY CORRUGATED FURNACE FLUES.
APPLICATION FILED SEPT. 19, 1903.
NO MODEL. 5 SHEETS—SHEET 2.
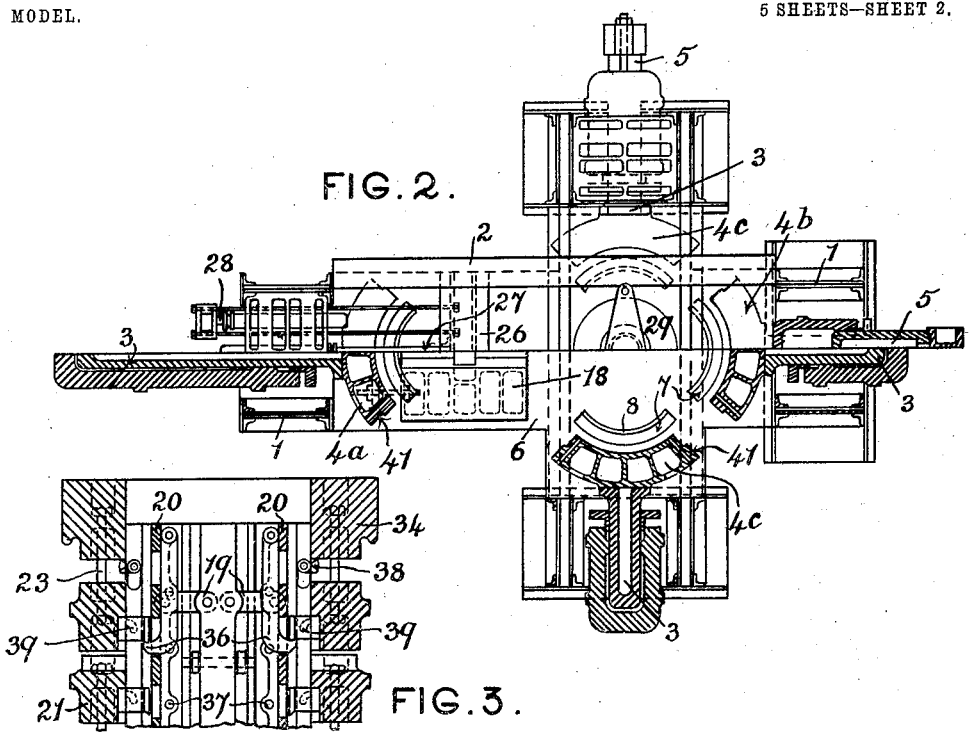
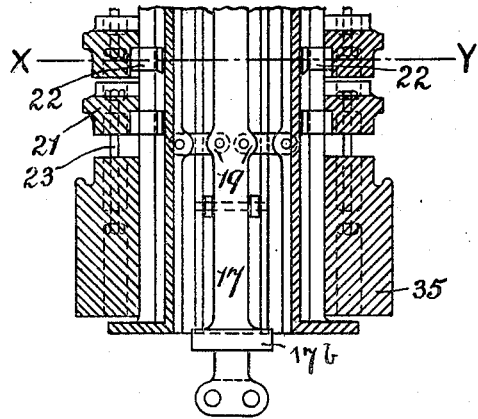
Witnesses
Inventor.
William Rainforth.
by Henry L. Reynolds
his attorney.

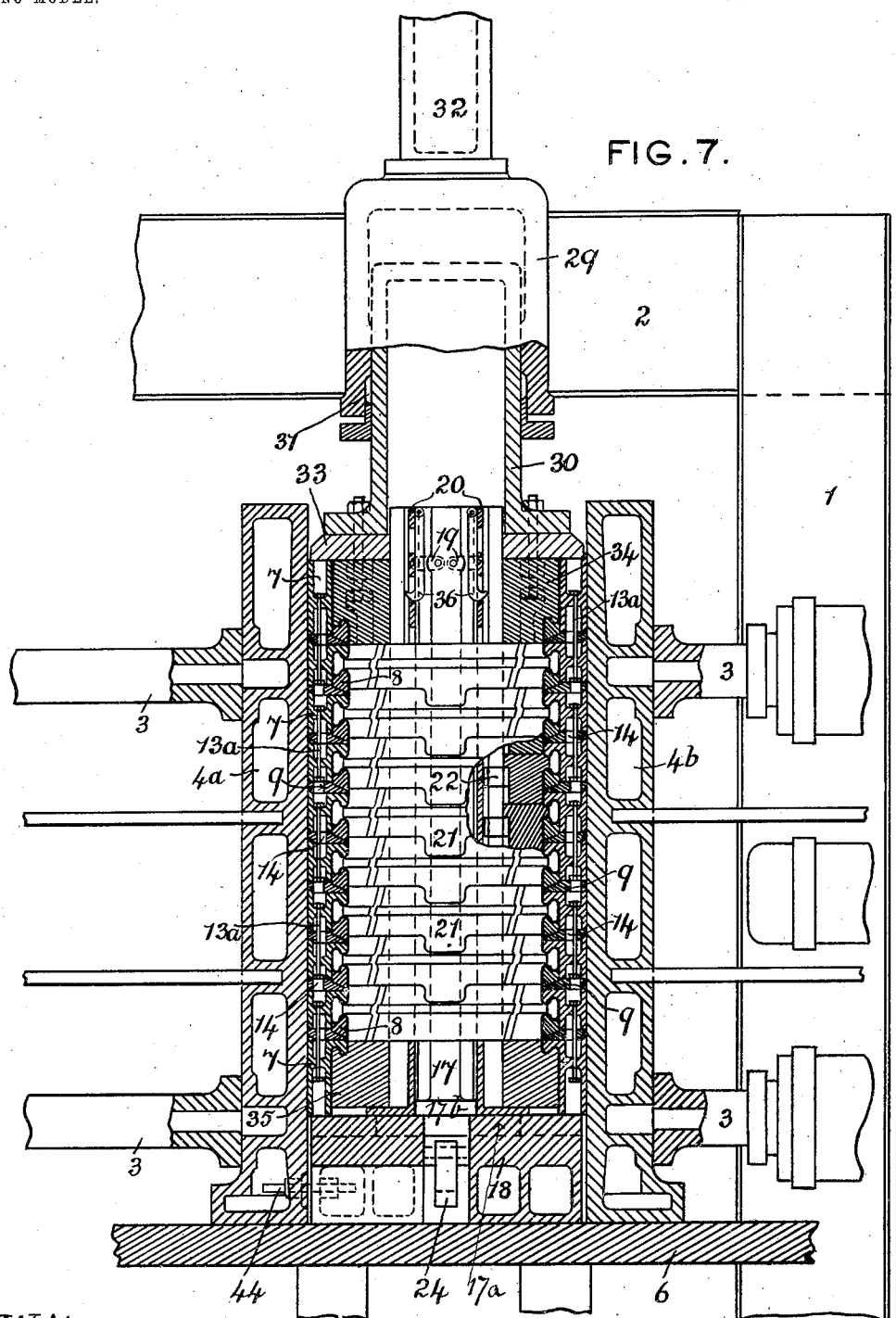

No. 770,108. PATENTED SEPT. 13, 1904.
W. RAINFORTH.
APPARATUS FOR MAKING DEEPLY CORRUGATED FURNACE FLUES.
APPLICATION FILED SEPT. 19, 1903.
NO MODEL. 5 SHEETS—SHEET 4.

Witnesses.
H. L. Bell
L. Cannon.

Inventor.
William Rainforth.
by Henry L. Reynolds.
his attorney.

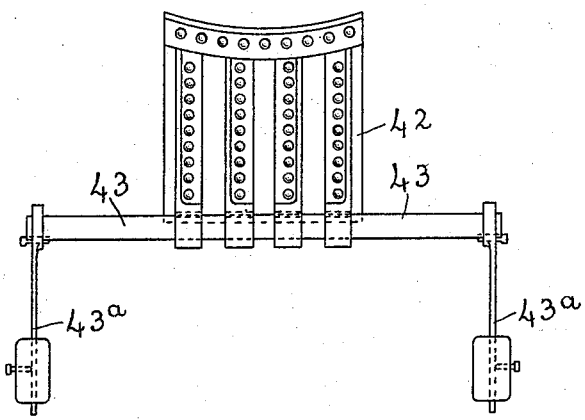
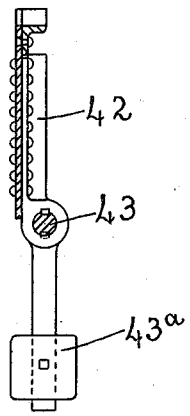
FIG.13.  FIG.14.
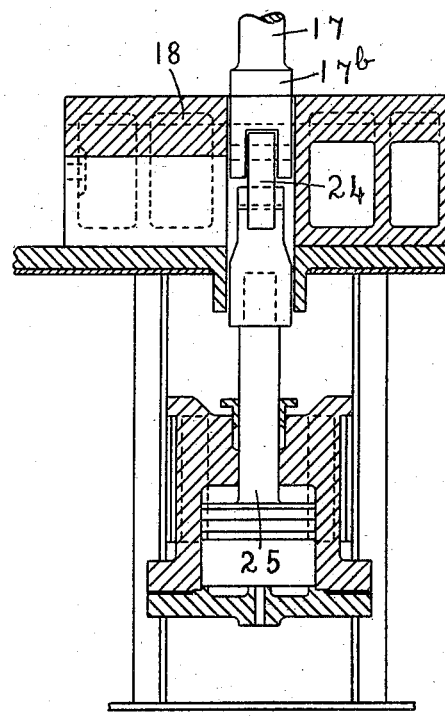
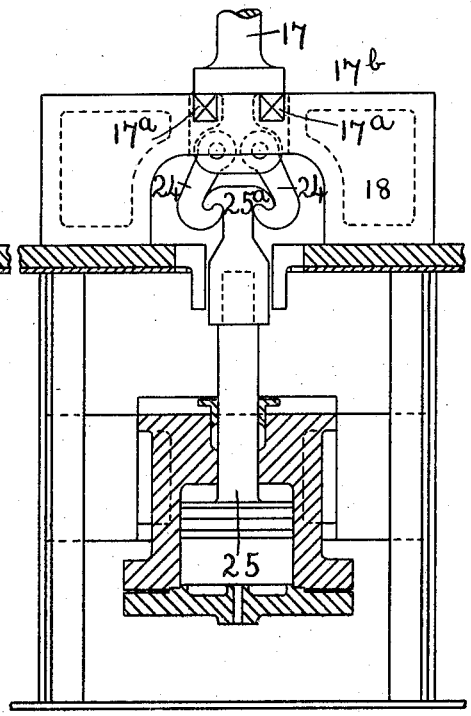
FIG.11.  FIG.12.

No. 770,108. Patented September 13, 1904.

UNITED STATES PATENT OFFICE.

WILLIAM RAINFORTH, OF LEEDS, ENGLAND, ASSIGNOR TO HIMSELF AND ERNEST GEARING, OF LEEDS, ENGLAND.

APPARATUS FOR MAKING DEEPLY-CORRUGATED FURNACE-FLUES.

SPECIFICATION forming part of Letters Patent No. 770,108, dated September 13, 1904.

Application filed September 19, 1903. Serial No. 173,872. (No model.)

*To all whom it may concern:*

Be it known that I, WILLIAM RAINFORTH, a subject of the King of Great Britain and Ireland, residing at Leeds, in the county of York, England, have invented a certain new and useful Improved Apparatus for Making Deeply-Corrugated Furnace-Flues, of which the following is a specification.

This invention relates to improved apparatus for the production by endwise pressure upon a previously-shallow corrugated flue or tube suitable for a furnace-flue of deepened and accentuated circumferential ridges in such flue in such a manner that the necks of such ridges near to the wall of the flue may be narrower than the outer bulbous heads of the said circumferential ridges.

Figures 1, 6:
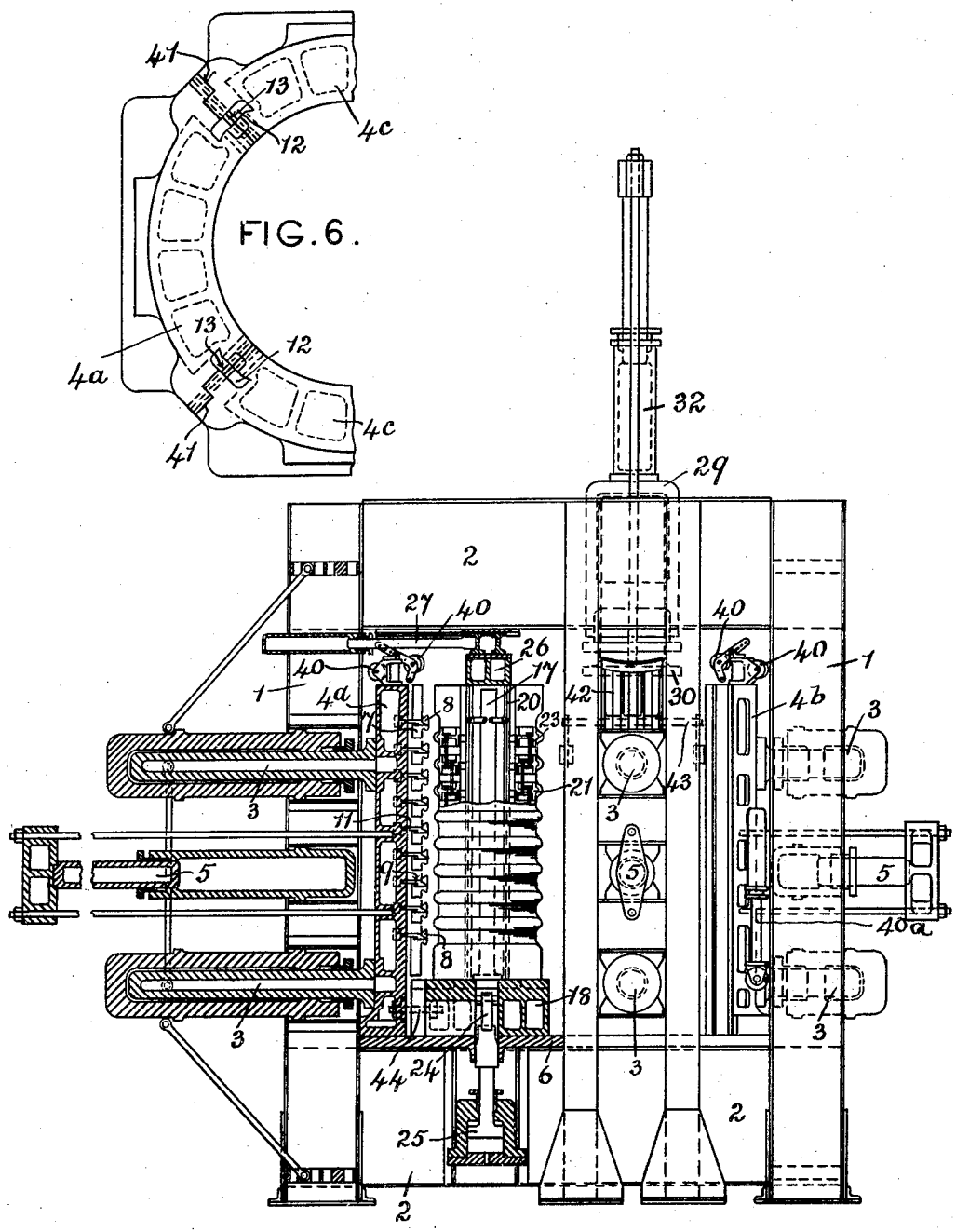
Figure 8:
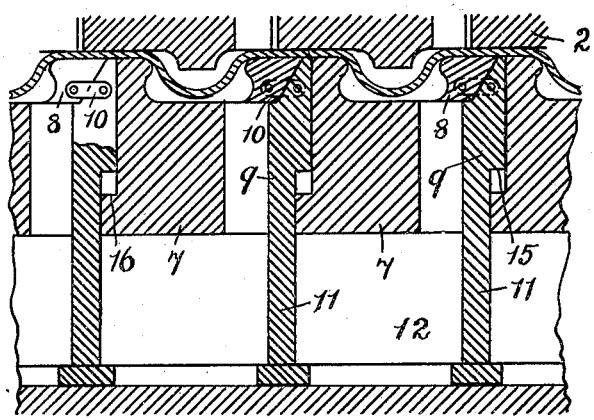
Figure 9:
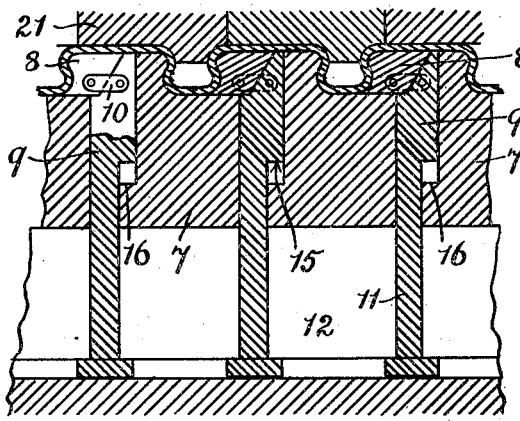
Figure 10:
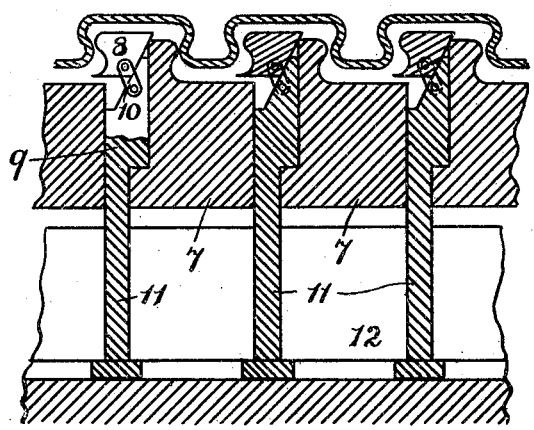

Figure 1 is a general elevation in half-section of this improved apparatus. Fig. 2 is a plan of the same, also in half-section. Fig. 3 is an enlarged longitudinal section of the mandrel within the flue or tube. Fig. 4 is a transverse section through the line X Y in Fig. 3 of the said mandrel. Fig. 5 is a perspective view of the wedge-ended ring-segment. Fig. 6 is a half-plan of the cylindrical casing-segment. Fig. 7 is a section, to an enlarged scale, through the flue under the endwise-compression ram. Figs. 8, 9, and 10 are enlarged longitudinal sections through the external die-segments before and after endwise compression and during removal after compression. Figs. 11 and 12 are respectively side sectional and part front sectional elevations of the hydraulic piston operating the mandrel-core, showing claw engagement between the hydraulic piston and the mandrel-core upon an enlarged scale. Figs. 13 and 14 are front side elevations in detail, upon an enlarged scale, of the auxiliary segment-locking device.

1 1 are main girder frames or columns tied together by cross-girders 2 2 above and below to render such framing rigid to hydraulic pressure and reaction between the various members of the frame.

The vertical columns 1 1 carry hydraulic rams 3 3 for operating sliding segments $4^a$, $4^b$, and $4^c$ of a cylindrical casing radially toward a common axis and return-rams 5 5 for opening such segments after they have been closed together. The said cylindrical segments are arranged to slide upon a smooth floor 6, which may, if desired, be provided with guiding-cheeks; but as the cylindrical segments are affixed to the heads of the operating-rams the said rams form a sufficient guide to the movement of the said cylindrical segments.

Within the cylindrical segments $4^a$, $4^b$, and $4^c$ are arranged segments of rings 7 8, a pair of such segmental rings being used to form each corrugation. Between each main segmental ring 7 is a wedge-ended ring 9, (see detail, Fig. 5,) which carries the smaller segmental ring 8 connected to it by pivoted arms 10, the smaller ring 8 and the larger ring 7 forming, together with the blunt end of the wedge-ended ring 9, the contour of the peculiar bulb-shaped corrugation to be produced.

The wedge-rings 9, carrying the smaller corrugating-ring 8, are connected to the cylindrical segments $4^a$, $4^b$, and $4^c$ by shanks 11 having T-heads which pass through and engage in slots 12 (see Fig. 6) in the cylindrical segment. For convenience of construction and mounting and dismounting the rings these slots are formed at the edges of the cylindrical segments by plates 13 affixed thereto. The wedge-ended rings 9 are thus free to move longitudinally in the cylinder-segments, but are held from falling out with their attached rings 8. The main corrugating-rings 7 are connected together by longitudinal bolts $13^a$, which permit the said rings to close together axially or to open out axially up to the limit of the length of such bolts. The said bolts also pass through slots 14 in the aforesaid wedge-ended rings and are thus held from falling out of place in the cylinder-segments $4^a$, $4^b$, and $4^c$.

The smaller segmental corrugating-ring 8 has an oblique back face adapted to rest upon the wedge-shaped end of the wedge-ring 9 when the ring 8 is at its farthest position away from the axis of the cylinder; but upon the withdrawal of the wedge-ring 9 from between the main segmental corrugating-rings 7 the ring 8 falls toward the ring 7, thus closing in the width of the combined pair of rings 7 and 8 to allow them to be withdrawn from the rabbeted or recessed corrugated groove of the flue that they have been instrumental in forming, as hereinafter explained.

Each wedge-ring 9 has a stepped edge 15 about the center of its body, which is adapted to engage a reversely-stepped edge 16 of the adjacent main corrugating-ring 7 after a certain outward travel of the wedge-ring 9 has taken place for purposes hereinafter described.

17 is the central shaft of a mandrel mounted on a sliding bed-block 18, such bed-block being arranged to move between guiding-cheeks from the central axis of the endwise-compressing ram to the position as shown in Fig. 1, clear of the overhead compressing-gear. This central shaft carries, by means of sets of parallel pivoted toggle-levers 19, four segmental pieces or shoes 20, into which the cylindrical body of the mandrel is divided and which may be thus expanded or collapsed by a longitudinal movement of the shaft 17 relatively to the segmental pieces or shoes 20.

Each segmental piece or shoe 20 carries a series of segmental rings 21 by means of tenon-tongues 22, sliding in longitudinal grooves in the said pieces or shoes. The segmental rings 21 thus have a free longitudinal movement on the mandrel, limited as to relative extension by longitudinal connecting-bolts 23. When the said mandrel is in the farthest position from the compressional axis of the apparatus, as shown in Fig. 1, the central shaft 17, which terminates at its lower end in a solid end with two hooks 24, pivoted on such head, serving to make an automatic sliding connection with a flanged head 25$^a$, Fig. 12, of the piston-rod 25 below, it is over a suitable aperture in the base-plate in the axis of a fixed hydraulic piston 25, capable of up-and-down motion under the control of suitable cocks or valves in a hydraulic pipe system in manner well known. The mandrel is also at the same time within the range of a top sliding abutment 26, operated in its travel in either direction by forward and return hydraulic rams 27 and 28 to take the upper thrust of the mandrel-shoes, so that it may be expanded by the upward thrust of the central mandrel-shaft 17, as hereinafter further described. Over the central axis of the plant toward which all the cylindrical segments 4$^a$, 4$^b$, and 4$^c$ converge is situated a vertical end-compression hydraulic cylinder 29, with open internal ram 30, passing through a stuffing-box 31. A return-ram 32 is mounted on the back of the main cylinder 29, by which the main ram 30 can be drawn back when desired.

The ram 30 terminates in a flange to which is affixed a disk 33 and a ring 34, adapted to fit inside the plain portion of the furnace-flue, so that the pressure of the ram 30 may be transmitted direct to the internal and external segmental die-rings during the end compression of the flue.

The mode of handling the flue and the apparatus is as follows: The cylindrical segments 4$^a$, 4$^b$, and 4$^c$ being withdrawn from the central axis of the apparatus as far as possible, the segment 4$^a$, which is adapted to move a considerable distance, carries with it the mandrel 20, which is thus slid out upon the base-plate from under the central compressing-ram 29 into the position shown in Fig. 1. The mandrel is collapsed into its smallest diameter, and the external segmental rings 21, with which it is furnished, according to the number of bulb-like corrugations that have to be produced upon the furnace-flue, are resting upon one another and upon a bottom segmental block 35. The central shaft 17 of the mandrel is now over the hydraulic piston 25 and has engaged the head 25$^a$ of the piston-rod by the swinging hooks 24, Fig. 12. In order to extend the segmental rings 21 laterally to one another to suit the spacing of the shallow corrugations formed by the preliminary rolling of the flue, the upper layer of segments is attached to any convenient overhead crane or lifting apparatus, the longitudinal bolts 23 between each of the adjoining segments causing each ring of segments to be successively lifted the required distance apart until they are all extended longitudinally, as desired. The tenon-tongues 22 of the uppermost layer of segment-rings 21 engage when at their predetermined highest position over swing-hooks 36, pivoted on the inner faces of the segmental bodies or shoes 20 of the mandrel, the points extending through slots in the shoes into the grooves in which the tenon-tongues 22 slide. There are several alternative positions of these hooks provided for at various heights from the top by pivot-lugs 37 to suit any desired length of flue. The extended segment-rings 21 are now automatically supported in that position by the swing-hooks 36, so that the lifting-tackle used for their extension may be disengaged and removed. Small release bell-cranks 38 are also inserted into slotted pivot-holes 39 in the segmental bodies or shoes of the mandrel opposite to these swing-hooks 36, one arm of the bell-crank extending outward beyond the body of the shoe 20 of the mandrel, where it will be engaged by a descending ring 34, attached to the endwise-pressure ram 30, used in a later stage, in order to release the segmental rings 21 for longitudinal movement under endwise pressure. The inner arms of the bell-cranks 38 pass through slots of the shoes 20, so as to press against the swing-hooks 36 and force them inward, thus disengaging the segmental rings 21 at a time hereinafter mentioned. In the present stage of proceedings, however, the rings 21 are extended and held automatically by the swing-hooks 36, the mandrel-shoes 20 being collapsed to their smallest diameter. The furnace-flue having been corrugated into shallow depressions in any known manner, such as by rolling, and having been again heated in an adjoining furnace (not shown) is swung by an overhead crane or lifting appliance and dropped over the aforesaid collapsed mandrel and segments, resting upon the mandrel-bed or on any convenient bed provided for it. The overhead thrust block or abutment 26 is now brought over the top of the mandrel, and the under hydraulic piston 25 is set in action to force up the central shaft 17 of the mandrel relatively to the held-down shoes 20. The consequence is the expansion of the segmental shoes 20 and the segmental rings 21 thereon, so as to tightly fit the interior of the furnace-flue, the external projections of the rings 21 entering the shallow corrugations of the flue and remaining there during the successive operations as gages of the width of the throat of the finished bulb-like ridge to be hereinafter produced by endwise compression. The shaft 17 is maintained in this position by blocks 17$^a$, driven under projecting lugs 17$^b$, Fig. 7, of the shaft. In order also that the segment die-rings 7 of the cylindrical segments 4$^a$, 4$^b$, and 4$^c$ shall be duly extended laterally after having been closed up by a former endwise compression, the topmost ring in each cylindrical segment must be lifted as before described for the mandrel-rings, and this is done most conveniently by chains or cords passing over pulleys 40, Fig. 1, fixed on the top of the cylindrical segments, small hydraulic cylinders 40$^a$ or balance-weights being used outside the cylindrical segments to keep the rings 7 in desired extended position and to release the same when required for end compression, the intermediate longitudinal connecting-bolts 13$^a$ serving to extend the rings successively at their proper predetermined distance apart. The cylindrical segment 4$^a$ with the longest travel is now closed up to the furnace-flue and mandrel and pushes the latter into the chief axis of the apparatus, where endwise pressure is to be effected. The end of the shaft 17 is disengaged from the hydraulic piston 25 by this sliding movement. The opposite cylindrical segment 4$^b$ meets the flue and mandrel when in proper position. The two side cylindrical segments 4$^c$ are now closed in, as in Fig. 7, their rabbeted edges 41, as in Fig. 6, thus locking the two cylindrical segments already in place. Should it be desired to reinforce the hydraulic closing action of the last two cylindrical segments 4$^c$, they may be mechanically locked in place by rocking struts 42, as shown in detail in Figs. 13 and 14, pivoted at 43 on the main frames and suitably counterbalanced by counterbalance-weights 43$^a$, Figs. 13 and 14. The flue is now in a position for the endwise compression by the overhead ram 30, as in Fig. 7, which is now advanced and by the ring 34 entering within the plain end of the flue and by the extension of the disk 33 presses upon the external die-rings 7 and 8 and the internal mandrel-rings 21, releasing the held-up mandrel-rings, as before described, by the downward movement of the rings 34. The rings 7, 8, and 21 thus closing together under endwise pressure mold the shallow corrugations of the flue with absolute accuracy into any desired form of contour, and particularly into a bulb-like form of ridge with contracted but open throat, as shown in enlarged detail in Figs. 8, 9, and 10, for which this form of plant is particularly devised. After endwise compression has been completed the endwise-compressing ram is lifted and the cylindrical segments 4$^a$, 4$^b$, and 4$^c$ have to be disengaged in the reverse order in which they were closed and the external die-rings 7 and 8 have to be disengaged from the rabbeted groove between adjacent ridges, in which they have closely fitted after end compression. This is effected by the action of the intermediate wedge-ended rings 9 and the smaller ring 8 pivoted thereto. As only the wedge-rings 9 are horizontally connected to the cylindrical segments 4$^a$, 4$^b$, and 4$^c$, the first outward movement of the segments draws the wedge-ended rings 9 from between the two adjacent main rings 7, (see Fig. 10,) allowing thereby the smaller die-ring 8 to fall over toward its adjacent main ring 7, thus reducing the width of the combined rings 7 and 8 sufficiently to enable them to be drawn through the contracted throat of the rabbeted groove in which they lie, when the stepped ridge 15 of the rings 9 engages with the corresponding reversed stepped edge 16 of the main ring 7. The segmental cylinders 4$^a$, 4$^b$, and 4$^c$ are thus retired to their most extreme positions from the common axis, the segment 4$^a$ carrying the mandrel and flue with it by connecting-bolts 44 between the mandrel bed-block 18 and the segment, a certain initial movement being allowed to the cylindrical segment 4$^a$ before it commences to move the mandrel bed-block 18. The swinging clips or hooks 24 of the mandrel-shaft 17 thereby automatically engage with the head of the hydraulic piston 25, by which the mandrel is then collapsed. The completed flue is lifted therefrom by the overhead tackle aforesaid, and the apparatus is ready for the treatment of a further flue as before described.

Having now described this invention, what I claim, and desire to secure by Letters Patent, is—

1. Apparatus for completing the production of a furnace tube or flue with pronounced or recessed circumferential ridges or bulbs in its wall, consisting of, in combination, vertical endwise-compression apparatus; framework supporting and connecting said endwise-compression apparatus with a solid bed-plate; segmental cylindrical casings adapted to converge to and recede from the axis of the endwise-compression apparatus; a vertical mandrel adapted to slide horizontally into and away from the vertical axis of endwise compression; segmental rings supported by the said cylindrical segments and by the said mandrel, and means for mechanically effecting all movements of the said apparatus.

2. In combination, in an apparatus for completing the production of a furnace tube or flue of the kind referred to, a vertically-mounted overhead hydraulic cylinder; a hollow ram therein with open flanged mouth; a disk attached thereto; a return small power ram mounted above the main ram; framework supporting and connecting said overhead rams with a solid bed-plate; segmental cylindrical casings adapted to slide on said bed-plate and to converge to and recede from the axis of the said overhead rams; a vertical mandrel supported on said bed-plate and adapted to slide horizontally into and away from the axis of said overhead rams; segmental rings supported by said cylindrical segments and by the said mandrel; and means for mechanically effecting all movements of the said apparatus.

3. In combination, in an apparatus for completing the production of a furnace tube or flue of the kind referred to, vertical endwise-compression apparatus; framework supporting and connecting the said endwise-compression apparatus with a solid bed-plate; four segmental cylindrical casings adapted to slide on the said bed-plate; forward and return hydraulic rams supported in the said framework and adapted to cause the cylindrical segments to converge to and recede from the axis of the endwise-compression apparatus; rabbeted joints in the edges of the said cylindrical segments causing two segments to lock the other two when closed together; an auxiliary locking-lever pivoted in the said framework fitted opposite to the two last closed cylindrical segments; a vertical mandrel connected to one of the said cylindrical segments, and adapted to slide into and away from the axis of the said converging segments; and segmental rings supported by the said cylindrical segments and the said mandrel.

4. In combination, in an apparatus for completing the production of a furnace tube or flue of the kind referred to, vertical endwise-compression apparatus; framework supporting and connecting the said endwise-compression apparatus with a solid bed-plate; segmental cylindrical casings, sliding on the said bed-plate, adapted to converge to and recede from, the axis of the endwise-compression apparatus; a vertical expansible and collapsible mandrel adapted to slide into and away from the vertical axis of endwise compression; a central sliding shaft in said mandrel connected by parallel levers, to a periphery of longitudinal segmental shoes; a hydraulic piston situated below extreme outward position of said mandrel; a sliding abutment above said mandrel in extreme outward position; segmental rings supported by the said cylindrical segments and by the mandrel; and means for mechanically effecting all movements of the said apparatus.

5. In combination, in an apparatus for completing the production of a furnace tube or flue of the kind referred to, a cylindrical casing divided into four segments, reverse rabbeted edges to the said segments by which two segments may lock the other two when closed up; forward and return hydraulic rams fixed in stable framing, fitted to each segment, adapted to cause them to converge to and recede from a common axis; segmental rings supported by the said cylindrical segments; and longitudinal slots in the edges of the said cylindrical segments formed by plates affixed to the said edges for the engagement of the ring-supporting bolts, with free longitudinal movement.

6. In combination, in an apparatus for completing the production of a furnace tube or flue of the kind referred to; segmental cylindrical casings having longitudinal slots at their edges; means for causing the said segmental cylinders to converge to and recede from a common axis; segmental die-rings supported in said segmental cylinders; connecting longitudinal bolts between the said segmental die-rings admitting lateral movement of the rings toward one another, and away from one another to a predetermined limit; a wedge-ended segmental plate-ring between each of the main segmental die-rings; T-headed shanks to each of the said wedge-ended plate-rings, engaging in the said slots of the segmental cylinders; reverse stepped shoulders on adjacent faces of the said plate-rings and die-rings, and a smaller segmental die-ring pivoted to the ends of each of the wedge-ended plate-rings.

7. In an apparatus for completing the production of a furnace tube or flue of the kind referred to, the combination with a main external segmental die-ring, or a smaller or auxiliary segmental die-ring pivotally mounted by links upon the end of a wedge-ended ring-plate adjacent to the said main die-ring.

8. In combination, in an apparatus for completing the production of a furnace tube or flue of the kind referred to, a main external segmental die-ring having a contour adapted to mold part of a recessed or rabbeted groove; a plate-ring adjacent to said main ring, having an outer end of the shape of the frustum of an incline or wedge; a smaller or auxiliary die-ring having a contour adapted to mold the remaining part of a recessed rabbeted groove, and having an inclined back corresponding to the inclination of the wedge-ended plate-ring; and pivoted links connecting the said auxiliary die-ring to the end of the wedge-ended ring-plate, so situated that in one position the auxiliary ring rests upon the inclined face of the plate-ring to complete the contour of the compound die, and upon withdrawal of the plate-ring will fall over toward the main die-ring to reduce the width of the compound die.

9. In combination, in an apparatus for completing the production of a furnace tube or flue of the kind referred to, a segmental cylindrical casing; segmental rings supported therein; longitudinal bolts between adjacent segmental rings, admitting lateral motion of segmental rings toward one another, and away from one another to predetermined limits; and a counterbalanced chain or cord passing over guiding-pulleys on the said segment and connected to the top segmental ring, to extend the whole set of rings to a predetermined limit after collapse.

10. In an apparatus for completing the production of a furnace tube or flue of the kind referred to, the combination with a sliding segmental cylindrical casing having means for the mechanical sliding of such casing, of a mandrel in the axis of such cylindrical segmental casing mounted on a sliding bed-block, connecting-bolts between the said cylindrical segment and the said sliding bed-block admitting a slight waste motion between them; and segmental rings supported on the said cylindrical segment and about the said mandrel.

11. In combination, in an apparatus for completing the production of a furnace tube or flue of the kind referred to, an expansible mandrel mounted on a sliding bed-block, a central shaft to said mandrel connected by parallel pivoted links to longitudinal segmental shoes; swinging clip ends at the lower end of said central shaft within the bed-block; and segmental rings supported on the said mandrel-shoes.

12. In combination in an apparatus for completing the production of a furnace tube or flue of the kind referred to, an expansible mandrel mounted on a sliding bed-block; a central shaft to said mandrel; parallel pivoted links connecting said shaft to longitudinal segmental shoes; segmental rings mounted so as to slide longitudinally on said shoes; connecting-bolts between adjacent rings adapted so as to admit movement of rings laterally toward one another, and away from one another to a predetermined distance from one another; means for automatically holding the said rings in an extended position; and means for releasing the same before endwise pressure is applied.

13. In combination in an apparatus for completing the production of a furnace tube or flue of the kind referred to, an expansible mandrel, having radially extensible and collapsible peripheral shoes; segmental rings adapted to slide axially on said shoes; connecting-bolts between adjacent rings allowing lateral movement of rings toward one another, and away from one another to a predetermined distance; clip swinging hooks pivoted at adjustable points in the top body of the mandrel adapted to automatically engage the top layer of segmental rings; and a throw-off bell-crank opposite each clip swinging hook in the body of the mandrel adapted to throw out engagement of said hook upon the descent of a ring outside the body of the mandrel.

In witness whereof I have hereunto set my hand in presence of two witnesses.

WILLIAM RAINFORTH.

Witnesses:
WILLIAM JOHNSTON,
HARRY SIDNEY HEPWORTH.